April 12, 1966 R. O. JOHNSON 3,245,599
SOLDERING TIP FOR ELECTRIC SOLDERING IRONS
Original Filed June 20, 1960
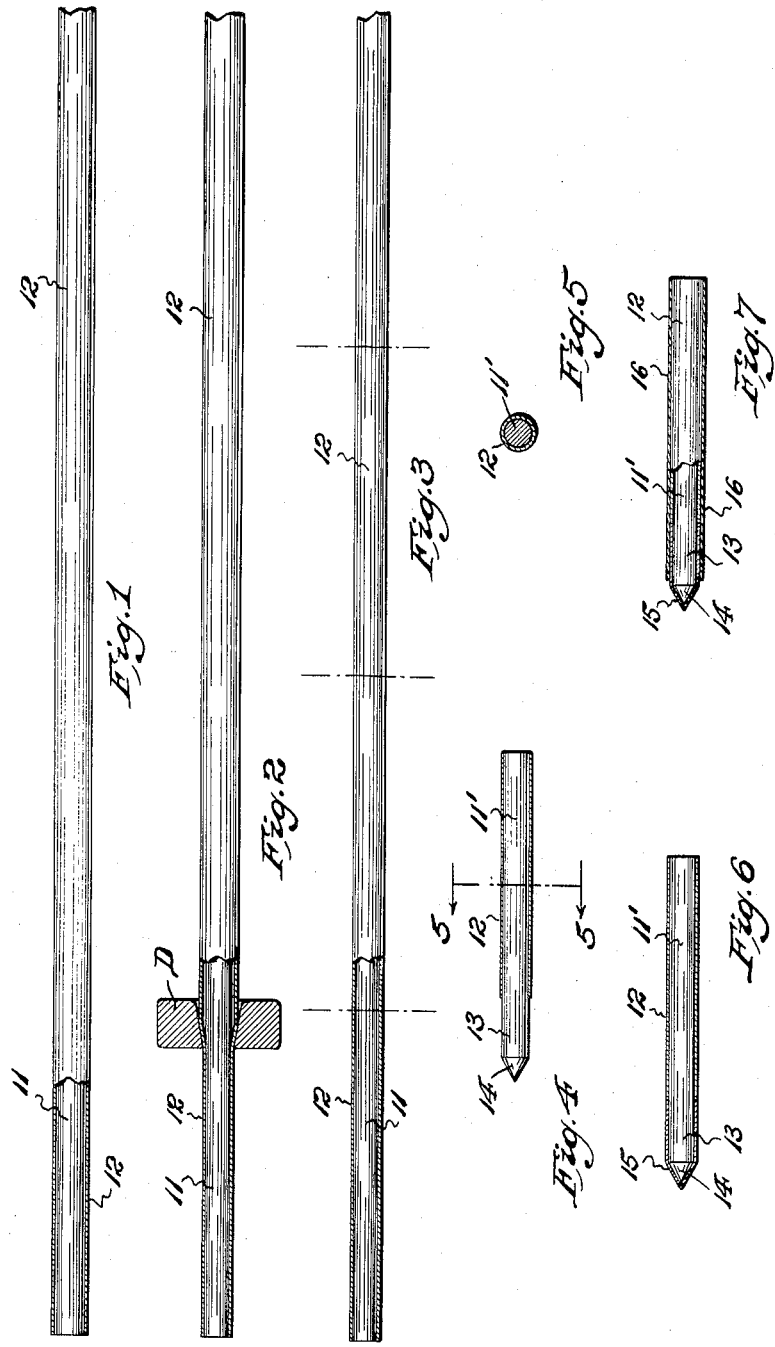
INVENTOR.
Richard O. Johnson,
BY
Richards and Gfill
Attorneys United States Patent Office 3,245,599
Patented Apr. 12, 1966

3,245,599
SOLDERING TIP FOR ELECTRIC
SOLDERING IRONS
Richard O. Johnson, Cranford, N.J., assignor, by mesne assignments, to Hexacon Electric Company, Roselle Park, N.J., a corporation of New Jersey
Original application June 20, 1960, Ser. No. 37,230, now Patent No. 3,109,231, dated Nov. 5, 1963. Divided and this application May 7, 1963, Ser. No. 278,601
2 Claims. (Cl. 228—54)

This invention relates to an improved detachable tip for an electric soldering iron.

It has heretofore been known that the useful life of a copper tip body, or a tip body of some other metal of high heat conductivity, for a soldering iron can be lengthened by coating the same with iron, or with other metal which possesses a harder wearing surface than that of the copper or other body metal. Such iron coating has usually been applied to the tip body by an electroplating process.

It has been proposed to apply a sleeve of stainless steel or other metal harder than iron, over the inner end portion or section of a copper or like tip body which is to be detachably inserted into the tip receiving opening of the heating element of an electric soldering iron, whereby to better protect such portion or section of the tip from oxidation than would an iron coating, and thus substantially eliminate risk of formation of scale by oxidation, and therefore reducing likelihood of the tip being adhered to the heating element in resistance to removal and replacement thereof relative to the electric soldering iron served thereby.

In carrying out such proposed application of a stainless steel sleeve or the like to a copper or like tip body, it has been proposed that the inner end portion or section of the tip body be machined off to reduce its diameter by an amount sufficient to accommodate the thickness of the sleeve, so that, when the latter was telescoped over the sleeve, so that, when the latter was telescoped over such reduced portion or section of the tip body, the tip would be of uniform diameter throughout its length. In order to retain the thus applied sleeve against displacement from the tip body, some form of mechanical fastening or coupling is required, such as indentations punched inwardly from the sleeve wall, and adapted to imbed themselves in the relatively soft metal of the tip body. Such fastening or coupling means tends to deform the tip, i.e. tends to throw the same out of round, thus increasing likelihood of the tip sticking or binding in the opening of the heating element of an electric soldering iron to which it is applied, and making it difficult to remove the tip for replacement.

Under the heretofore proposed practice above referred to, not only does the resultant tip structure possess inherent disadvantages, but is costly to produce. It is costly to machine or turn down the copper or like tip body for reception of the stainless steel sleeve, and the longer such turned down portion or section the more costly. By reason of this, the machined or turned down portion or section is kept to a minimum length, so that the sleeve covers only so much of the tip body length as is required to be entered into the heating element of an electric soldering iron to which the tip is to be applied. Due to this, a relatively long exposed outer end portion or section of the tip body is left which must be iron plated, thus increasing the cost of the plating operation, since more current and more plating material must be used. Furthermore, since there is left a seam at the point where the outer end of the sleeve meets the shoulder of the turned down portion or section of the tip body, and by reason of the fact that the tip body is already weakened by its reduced diameter at this point, a weak spot is created so that risk of breakage at this point is involved. This is especially true with respect to tips of the smaller diameters. Another disadvantage is the fact that, since the sleeve fits somewhat loosely over the tip body, an intermediate air space is left which not only itself decreases thermal conductivity of the tip, but also permits oxygen to enter this space with resultant likelihood of scale formation which will further reduce thermal conductivity.

Having the above in view, it is an object of this invention to provide an improved tip structure of the stainless steel clad type which avoids the disadvantages of heretofore proposed tips of this class above referred to. The herein disclosed novel method of producing the improved structure is claimed in my co-pending application, Serial No. 37,320, now Patent No. 3,109,231, filed June 20, 1960, of which application the present is a divisional application.

A further object of this invention is to provide a detachable tip for an electric soldering iron, said tip comprising a copper or like tip body having a stainless steel or like sleeve intimately, tightly and immovably applied thereto over a major portion of its length, so as to leave but a short outer working end portion or section exposed subject to iron plating, all whereby a tip of great strength and greatly improved appearance results.

The above and other objects will become apparent from a reading of the following description of my invention in connection with the accompanying drawings, in which:

FIGS. 1 to 4 inclusive are side elevational views in part section which respectively illustrate successive steps of the novel method by which the soldering iron tip of my invention is produced; and FIG. 5 is a cross-sectional view, taken on line 5—5 in FIG. 4.

FIG. 6 is a side elevational view in part section of a finished soldering iron tip according to my invention; and FIG. 7 is a similar view of another form of the finished tip.

Like characters of reference are employed in the several views of the drawings to indicate corresponding parts.

By the novel method for producing soldering iron tips, especially for use in electric soldering irons, according to my invention, a copper rod 11, of suitable diameter and undeterminate length, is provided. Over this copper rod 11 is telescoped a corresponding length of stainless steel tubing 12, of an initial internal diameter somewhat larger than the external diameter of the copper rod 11 (see FIG. 1). The wall thickness of the tubing 12 may be from .001 to .040 inch in thickness, according to the desired diametric size of the copper body of the finished tip.

The thus assembled copper rod 11 and stainless steel sleeve 12 is drawn through a suitable die D, thereby drawing down the sleeve 12 to such reduced diameter that the same will be compressed into initimate, tightly hugging, enveloping relation to and about the copper rod 11, with all intervening air space entirely eliminated, and so that an intermetallic sealing bond is formed therebetween (see FIG. 2). The union of the stainless steel and copper rod thus attained strongly binds the same together against relative movement or displacement, and, since no air space exists therebetween risk of oxidation or scale formation therebetween is prohibited.

The length of copper rod 11, as thus clad in the stainless steel sleeve 12, is now ready to be cut into sections of suitable length substantially corresponding to the lengths of soldering iron tips desired to be produced. This is indicated in FIG. 3, wherein points of divisions are denoted by transverse broken lines. Preferably, the long length of stainless steel clad copper rod is machined, e.g. by an automatic screw machine operation, such as employed to divide a bare copper rod into soldering tip lengths and to shape the operative tip ends of the latter. By such operation, the stainless steel clad copper rod is not only divided into soldering tip bodies 11', but short forward end portions of the stainless steel sleeve are stripped away and removed, thereby exposing a bare copper forward shaft portion 13, ordinarily about one-half inch in length and approximating about one-fifth to one-third of the length of the tip body 11', while also shaping the extremity 14 thereof to provide a working end of pointed or other desired conformation (see FIG. 4). There is no more machining time involved in this operation than required to machine a bare or unclad copper rod.

My method, as thus far described, eliminates time consuming and costly cutting to length separately the copper tip bodies and stainless steel sleeves, and therefore avoids the costly and time consuming hand operations required to insert individual copper tip bodies into individual sleeves, as well as additional operations required to mechanically affix the applied sleeves to the tip bodies against displacement therefrom. My method also avoids necessity for machining or turning down rear end portions of the copper tip bodies over which the sleeves are to be fitted, so that the finished soldering tip will possess a uniform diameter from end to end.

The forward shaft portion 13 having been formed, the same is next electroplated with a coating of iron 15 (see FIG. 6), thus obtaining a finished soldering iron tip. Since, under my method, the forward shaft portion 13 is relatively short, as compared with the total length of the soldering iron tip, it will be obvious that necessity of costly and critical iron plating of a long length of forward shaft portion, which under the heretofore practice above referred to, was of a length of about two inches, or approximately substantially one-half of the length of the tip, is avoided, so that the cost of the iron plating operation under my method is substantially reduced.

By reason of the fact that the copper tip body 11' of my invention is not required to be reduced in diameter for the reception of a stainless steel sleeve, there is no weak point intermediate its ends, which involves risk of breakage. Furthermore, by reason of the fact that, under my invention, the stainless steel sleeve is so tightly bound and united to the copper tip body, the tip cannot become out of round, with involved risk of sticking or binding in the tip receiving opening of the heating element of an electric soldering iron to which it is applied in use, in resistance to detachment and replacement.

The forward shaft portion 13 and, if desired, the entire tip, with the exception of the working end 14, is electroplated with a coating 16 of a metal which resists wetting by solder or tin, such e.g. as chrome (see FIG. 7). Such chrome or like plating not only increases the tip life, but, since solder does not readily adhere to it, also prevents the solder from undesirable creeping up the tip exterior into the heating element opening of the iron in which the tip is entered, while also decreasing possibility of solder dropping onto the work being operated upon.

In the above description of my invention, copper is stated to be the material of the core rod 11, but not by way of limitation, and consequently other suitable metal of high heat conductivity could be substituted for copper. Similarly, although the material of the core enveloping sleeve 12, is described as stainless steel, other suitable metals more resistant to oxidation than iron may also be employed.

In the above description of my invention, iron plating is stated to be the protective coating used, but not by way of limitation, and consequently other suitable coatings which are more resistant to wear than the copper tip may also be employed.

Having now described my invention, I claim:

1. A detachable soldering tip for use in an electric soldering iron comprising a copper rod having a relatively long shaft portion for insertion in such an iron and a relatively short forward shaft portion terminating in a suitably shaped working end, said relatively long shaft portion of said copper rod being closely enveloped by a stainless steel sleeve immovably fixed thereto, said forward shaft portion of the copper rod including said working end being enveloped in an electroplated coating of iron, and an external coating of a metal resistant to wetting by solder enveloping at least the iron-coated forward shaft portion of said tip adjacent to but not including said working end.

2. A soldering tip according to claim 1 wherein, the steel sleeve is bonded to the copper rod by drawing the rod and sleeve through a die, the metal resistant to wetting by solder is chrome, and the working end of the tip has an external coating of solder.

References Cited by the Examiner

UNITED STATES PATENTS

| 1,985,492 | 12/1934 | Frokmuth et al. | 113—105 |
| 2,213,438 | 9/1940 | Young | 113—105 |
| 2,758,191 | 8/1956 | Bell | 113—105 |
| 3,125,055 | 3/1964 | Lerner | 113—105 |

FOREIGN PATENTS

| 132,662 | 6/1949 | Australia. |
| 522,615 | 6/1940 | Great Britain. |
| 674,661 | 6/1952 | Great Britain. |

OTHER REFERENCES

Finch, Serial No. 82,457 (Abstract), filed Mar. 19, 1949, published Aug. 29, 1950.

WHITMORE A. WILTZ, *Primary Examiner.*

M. L. FAIGUS, *Assistant Examiner.*